United States Patent
Kim et al.

(10) Patent No.: US 10,433,345 B2
(45) Date of Patent: Oct. 1, 2019

(54) NAV SETTING METHOD CONSIDERING BSS COLOR INACTIVATION IN WIRELESS LAN SYSTEM AND APPARATUS THEREFOR

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/774,259

(22) PCT Filed: Apr. 26, 2017

(86) PCT No.: PCT/KR2017/004404
§ 371 (c)(1),
(2) Date: May 7, 2018

(87) PCT Pub. No.: WO2017/188712
PCT Pub. Date: Nov. 2, 2017

(65) Prior Publication Data
US 2018/0359779 A1    Dec. 13, 2018

Related U.S. Application Data

(60) Provisional application No. 62/327,445, filed on Apr. 26, 2016, provisional application No. 62/412,226, (Continued)

(51) Int. Cl.
*H04W 74/08* (2009.01)
*H04W 48/16* (2009.01)
(Continued)

(52) U.S. Cl.
CPC ......... *H04W 74/085* (2013.01); *H04W 48/16* (2013.01); *H04W 72/0446* (2013.01);
(Continued)

(58) Field of Classification Search
CPC .................................................. H04W 74/0816
See application file for complete search history.

(56) References Cited

U.S. PATENT DOCUMENTS

2017/0094685 A1* 3/2017 Noh .................... H04W 72/042
2017/0359300 A1* 12/2017 Patil .................... H04L 61/1541
(Continued)

FOREIGN PATENT DOCUMENTS

| KR | 1020030018051 | 3/2003 |
|----|---------------|--------|
| KR | 1020150082393 | 7/2015 |

(Continued)

OTHER PUBLICATIONS

Wilus, 'Issues on BSS Color Bits Collision', doc.: IEEE 802.11-16/0396r0, Mar. 14, 2016. See Slide 2-3, 13, 15. (Year: 2016).*
(Continued)

*Primary Examiner* — Hoon J Chung
(74) *Attorney, Agent, or Firm* — Lee Hong Degerman Kang & Waimey

(57) ABSTRACT

When an AP detects a collision between a neighbor BSS and a BSS color in a wireless LAN system, the AP can inform an STA of the same through information indicating whether the BSS color is disabled, and set and transmit a TXOP_duration field of a transmitted frame to a specific value differentiated from a normal duration value in order to prevent an erroneous NAV setting of the STA.

14 Claims, 12 Drawing Sheets

Related U.S. Application Data filed on Oct. 24, 2016, provisional application No. 62/434,423, filed on Dec. 15, 2016, provisional application No. 62/433,795, filed on Dec. 14, 2016.

(51) Int. Cl.
*H04W 72/04* (2009.01)
*H04W 74/00* (2009.01)
*H04W 84/12* (2009.01)

(52) U.S. Cl.
CPC ........ *H04W 74/006* (2013.01); *H04W 74/008* (2013.01); *H04W 84/12* (2013.01); *Y02D 70/00* (2018.01); *Y02D 70/10* (2018.01); *Y02D 70/14* (2018.01)

(56) References Cited

U.S. PATENT DOCUMENTS

| | | | |
|---|---|---|---|
| 2018/0014327 A1* | 1/2018 | Park | H04W 74/0808 |
| 2018/0020448 A1* | 1/2018 | Huang | H04B 7/0452 |

FOREIGN PATENT DOCUMENTS

| | | | | |
|---|---|---|---|---|
| WO | 2015050311 | | 4/2015 | |
| WO | 2015112780 | | 7/2015 | |
| WO | WO-2015112780 A1 | * | 7/2015 | ......... H04L 12/6418 |
| WO | 2015120488 | | 8/2015 | |
| WO | WO-2015120488 A1 | * | 8/2015 | ............. H04W 8/26 |
| WO | WO-2016021792 A1 | * | 2/2016 | ............ H04W 84/12 |

OTHER PUBLICATIONS

PCT International Application No. PCT/KR2017/004404, International Search Report dated Jul. 24, 2017, 10 pages.

* cited by examiner

FIG. 6

| B0 | B5 B6 | B8 | B9 | B10 | B19 | B20 | B21 | B22 | B27 | B28 | B29 | B30 | B31 |
|---|---|---|---|---|---|---|---|---|---|---|---|---|---|
| BSS Color | DefaultPE Duration | TWT Required | HE Duration Based RTS Threshold | | | Partial BSS Color | VHT Operation Information Present | Reserved | | Multiple BSSID AP | TxBSSID Indicator | BSS Color Disabled | Dual Beacon |
| Bits: 6 | 3 | 1 | 10 | | | 1 | 1 | 6 | | 1 | 1 | 1 | 1 |

| Rx NSS | Rx Channel Width | IP-PS status [on or off] |
|---|---|---|

NAV SETTING METHOD CONSIDERING BSS COLOR INACTIVATION IN WIRELESS LAN SYSTEM AND APPARATUS THEREFOR

CROSS-REFERENCE TO RELATED APPLICATIONS

This application is the National Stage filing under 35 U.S.C. 371 of International Application No. PCT/KR2017/004404, filed on Apr. 26, 2017, which claims the benefit of U.S. Provisional Application No. 62/327,445, filed on Apr. 26, 2016, 62/412,226, filed on Oct. 24, 2016, 62/434,423, filed on Dec. 15, 2016, and 62/433,795, filed on Dec. 14, 2016, the contents of which are all hereby incorporated by reference herein in their entirety.

TECHNICAL FIELD

The present specification relates to a wireless LAN system, and more particularly, to a method of setting a NAV in consideration of disablement of a BSS color in a wireless LAN system and an apparatus therefor.

BACKGROUND ART

A method described in the following can be applied to various wireless communications. In the following, a WLAN (wireless local area network) system is explained as an example of a system to which the present invention is applicable.

Standards for a Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE OF THE INVENTION

Technical Tasks

In IEEE 802.11ax system, discussion on an intra-PPDU power saving method is in progress. According to the intra-PPDU power saving method, if an STA (station) receives a frame not received by the STA in a BSS to which the STA belongs, the STA enters a doze state until the frame ends to prevent power consumption of the STA.

In this case, BSS color information, which is used for the STA to identify whether or not a received frame corresponds to a frame of the STA, is represented by the limited number of bits. As a result, a collision occurs between a neighbor BSS and BSS color and an error may occur.

When a collision occurs in the aforementioned BSS color, an object of the present invention is to provide a method of efficiently inducing an STA to reduce power consumption and an apparatus therefor.

The present invention is not restricted to the aforementioned technical task and other technical tasks can be derived from embodiments of the present invention.

Technical Solution

To achieve these and other advantages and in accordance with the purpose of the present invention, as embodied and broadly described, according to one embodiment, a method of controlling a NAV (network allocation vector) setting of an STA (station), which is controlled by an AP (access point) in a wireless LAN system, includes the steps of detecting a BSS (basic service set) color overlap with an OBSS (overlapping basic service set), transmitting a first frame including BSS color disabled information set to a first value indicating disablement of BSS color information to the STA, and transmitting a second frame including a TXOP_DURATION field set to a specific value differentiated from a normal duration value to the STA.

If a value of the TXOP_DURATION field is set to the specific value, the STA may not update a NAV based on the value of the TXOP_DURATION field.

Although BSS color of the second frame is identical to BSS color of a BSS to which the STA belongs thereto, the BSS color disabled information set to the first value can make the STA update an inter-BSS NAV.

If a value of the TXOP_DURATION field is set to the specific value, the STA may not update the inter-BSS NAV.

If a value of the TXOP_DURATION field is set to the specific value, the STA may operate based on an EIFS (extended inter-frame space).

A specific value of a value of the TXOP_DURATION field may correspond to a value that all bits are set to 1.

To further achieve these and other advantages and in accordance with the purpose of the present invention, according to a different embodiment, a method of configuring a NAV (network allocation vector) of an STA (station) in a wireless LAN system includes the steps of receiving a first frame including BSS color disabled information set to a first value indicating disablement of BSS (basic service set) color information from an AP (access point), and receiving a second frame including a TXOP_DURATION field set to a specific value differentiated from a normal duration value from the AP. In this case, if a value of the TXOP_DURATION field is set to the specific value, the STA may not update a NAV based on the value of the TXOP_DURATION field.

The first frame including the BSS color disabled information set to the first value can be received when the AP detects a BSS (basic service set) color overlap with an OBSS (overlapping basic service set).

If the BSS color disabled information set to the first value is received, the STA can update an inter-BSS NAV, although BSS color of the second frame is identical to BSS color of a BSS to which the STA belongs thereto.

If a value of the TXOP_DURATION field is set to the specific value, the STA may not update the inter-BSS NAV.

If a value of the TXOP_DURATION field is set to the specific value, the STA may operate based on an EIFS (extended inter-frame space).

A specific value of a value of the TXOP_DURATION field may correspond to a value that all bits are set to 1.

To further achieve these and other advantages and in accordance with the purpose of the present invention, according to a further different embodiment, an AP controlling a NAV (network allocation vector) setting of an STA (station) in a wireless LAN system includes a processor configured to detect a BSS (basic service set) color overlap with an OBSS (overlapping basic service set), and if the processor detects a BSS color overlap, a transceiver configured to transmit a first frame including BSS color disabled information set to a first value indicating disablement of BSS color information, and a second frame including a TXOP_DURATION field set to a specific value differentiated from a normal duration value to the STA under the control of the processor.

To further achieve these and other advantages and in accordance with the purpose of the present invention, according to a further different embodiment, an STA (station) performing a NAV (network allocation vector) setting in a wireless LAN system includes a transceiver configured to receive a first frame including BSS color disabled information set to a first value indicating disablement of BSS (basic service set) color information, and a second frame including a TXOP_DURATION field set to a specific value differentiated from a normal duration value from the AP, and if a value of the TXOP_DURATION field is set to the specific value, a processor configured not to update a NAV based on the value of the TXOP_DURATION field.

Advantageous Effects

According to the aforementioned scheme, although a collision occurs in BSS color, it is able to efficiently induce an STA to reduce power consumption.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 6 is a diagram for explaining a format of a HE operation parameters field according to one embodiment of the present invention;

BEST MODE

Mode for Invention

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Figure 1:
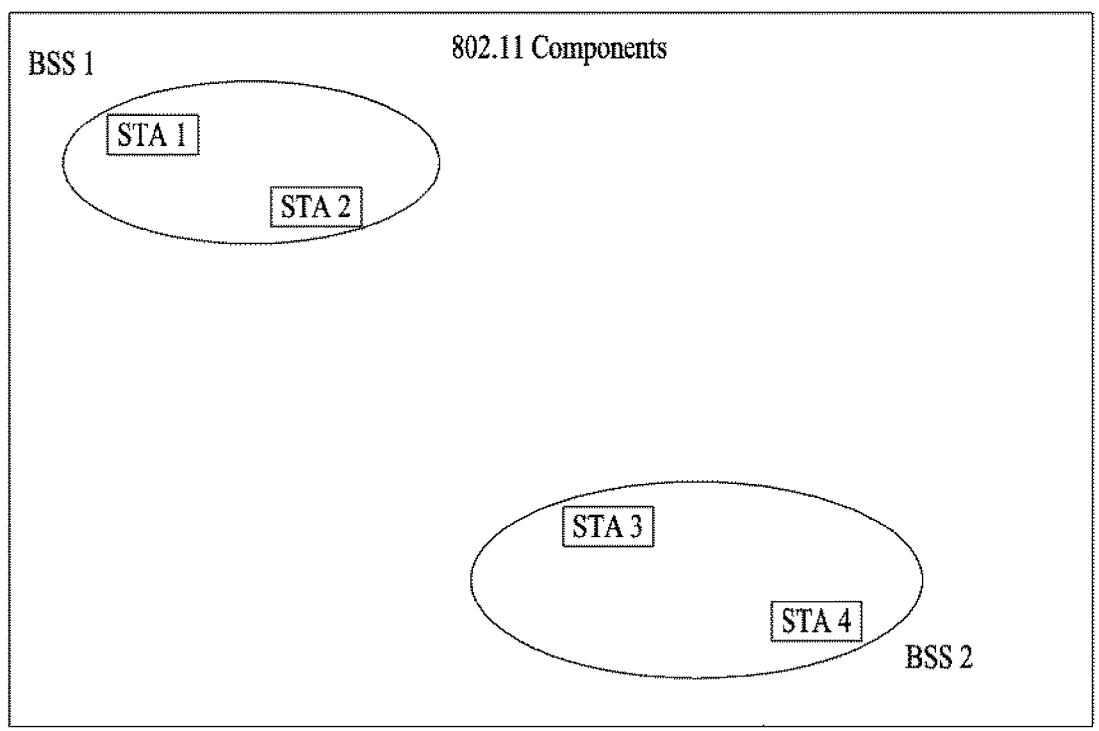
FIG. 1 is a diagram illustrating an exemplary configuration of a WLAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
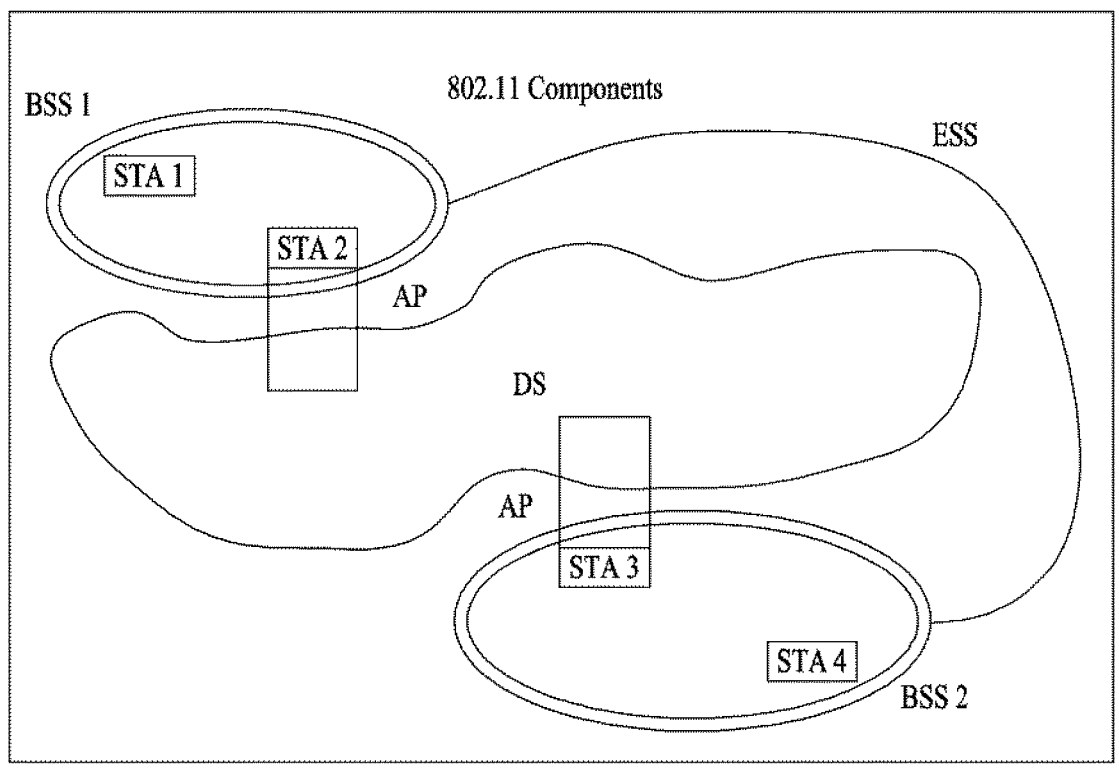
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Figure 3:
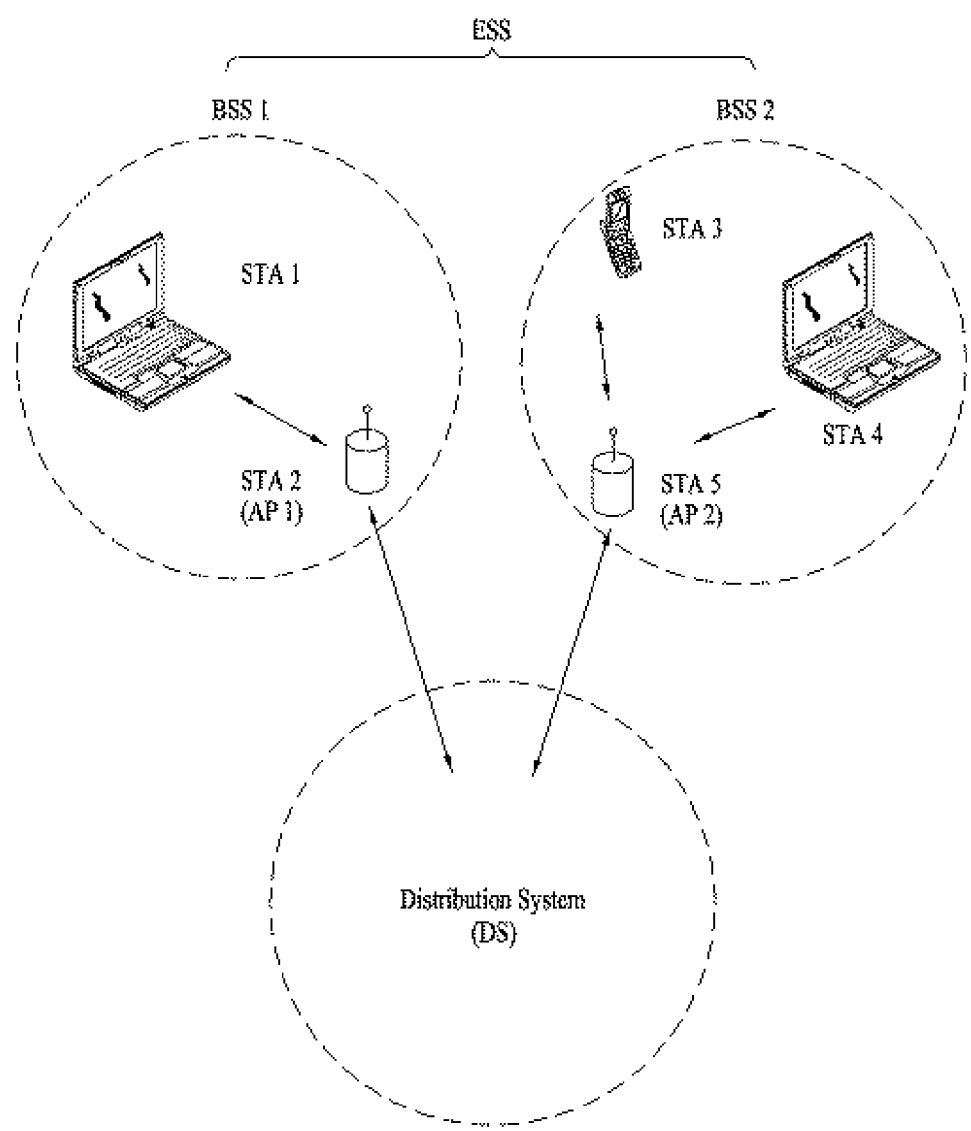
FIG. 3 is a diagram for an exemplary configuration of a WLAN system.

FIG. 3 is a diagram for an exemplary configuration of a WLAN system. FIG. 3 shows an example of a base structure BSS including a DS.

According to an example shown in in FIG. 3, a BSS1 and a BSS 2 construct an ESS. In a WLAN system, an STA corresponds to a device operating according to MAC/PHY regulation of IEEE 802.11. An STA includes an AP STA and a non-AP STA. In general, the non-AP STA corresponds to such a device directly handled by a user as a laptop computer, a mobile phone and the like. In the example of FIG. 3, an STA 1, an STA 3 and an STA 4 correspond to the non-AP STA and an STA 2 and an STA 5 correspond to the AP STA.

In the following description, the non-AP STA may be referred to as a terminal, a WTRU (wireless transmit/receive unit), a UE (user equipment), an MS (mobile station), a mobile terminal, an MSS (mobile subscriber station) and the like. And, an AP is a concept corresponding to a BS (base station), a Node-B, an eNB (evolved Node-B), a BTS (base transceiver system), a femto BS, and the like in a different wireless communication field.

As mentioned in the foregoing description, the present invention relates to a power saving mode of an STA in a next generation WLAN system (802.11ax). In particular, the present invention relates to operations of UEs that an HE-STA operates as an intra-PPDU PS for HE PPDU (HE UL SU PPDU, HE MU PPDU, HE trigger-based PPDU) including BSS color.

To this end, first of all, a power saving scheme in 11ax is explained.

Figure 4:
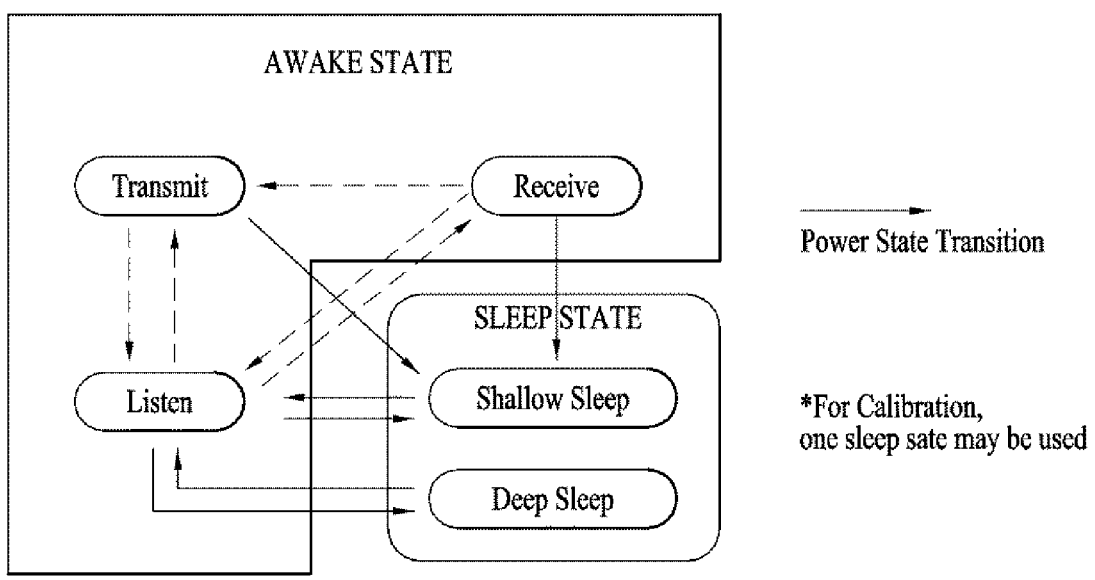
FIG. 4 illustrates an awake state and a sleep state defined in 11ax.

FIG. 4 illustrates an awake state and a sleep state defined in 11ax.

In general, a sleep state (or, a doze state) can include a shallow sleep state and a deep sleep state. The deep sleep state corresponds to a sleep state consuming minimum power (non-zero) and requires longest time to switch to a listen state. The shallow sleep state corresponds to a sleep state consuming power relatively greater than power consumed by the deep sleep state. The shallow sleep state can more quickly switch to the listen state compared to the deep sleep state.

Meanwhile, definition on the shallow sleep state and the deep sleep state can be modified as follows. The deep sleep state corresponds to a state that a wireless communication (wireless radio) is turned off, i.e. a sleep state that RF, a baseband processor, and a MAC processor are all switched off. In the deep sleep state, leakage power can be consumed only. The shallow sleep state may correspond to a state that RF is switched off while a baseband processor and a MAC processor are turned on.

Table 1 shows an example of current consumption in the deep sleep state.

TABLE 1

Power State parameters
Average Current Consumption [mA]
Voltage = 1.1 V,
Band = {2.4 GHz, 5 GHz}, NSS = {1},
Number of TX/RX antennas = {1}, TX power per antenna = {15 dBm}

| Power State | Bandwidth = {20 MHz} | Bandwidth = {40 MHz} | Bandwidth = {80 MHz} |
|---|---|---|---|
| Transmit | 280 mA | 280 mA | 280 mA |
| Receive | 100 mA | 140 mA | 200 mA |
| Listen | 50 mA | 60 mA | 75 mA |
| Shallow Sleep | 0.9 mA | 0.9 mA | 0.9 mA |
| Deep Sleep | 0.09 mA | 0.09 mA | 0.09 mA |

Table 2 shows power and latency of state transition of 802.11ax.

TABLE 2

Power Transition parameters

| State Transitions | Transition Time (ms) | Average Power Consumption (mW) |
|---|---|---|
| Transmit to Listen | $T_{IL}$ = 0.01 ms | 75 mW |
| Receive ⇔ Listen | 0.001 ms | 55 mW |
| Listen to Transmit | $T_{LT}$ = 0.01 ms | $P_{LT}$ = 100 mW |
| Transmit to Shallow Sleep | $T_{TS}$ = 0.01 ms | $P_{TS}$ = 15 mW |
| Receive to Shallow Sleep | $T_{RS}$ = 0.2 ms | PRS = 15 mW |
| Listen to Shallow Sleep | $T_{LS}$ = 0.2 ms | PLS = 5 mW |
| Shallow Sleep to Listen | 0.5 ms ($T_{SL}$) | |
| Listen to Deep Sleep | $T_{LD}$ = 1 ms | $P_{DS}$ = 5 mW |
| Deep Sleep to Listen | $T_{SDL}$ = 10 ms | |

If an STA supporting HE PPDU (hereinafter, HE STA) receives intra-BSS PPDU (e.g., non-HT, VHT, or HE PPDU) and the received intra-BSS PPDU is not intended for the HE STA, the HE STA can reduce power consumption by switching to a doze state.

Intra PPDU PS Operation for HE PPDU

If an STA supporting HE PPDU (hereinafter, HE STA) receives intra-BSS HE PPDU and the received intra-BSS PPDU is not intended for the HE STA, the HE STA can reduce power consumption by switching to a doze state. In this case, in order to determine whether or not the HE PPDU corresponds to intra-BSS PPDU, the HE STA may use BSS color information included in HE-SIG A.

Figure 5:
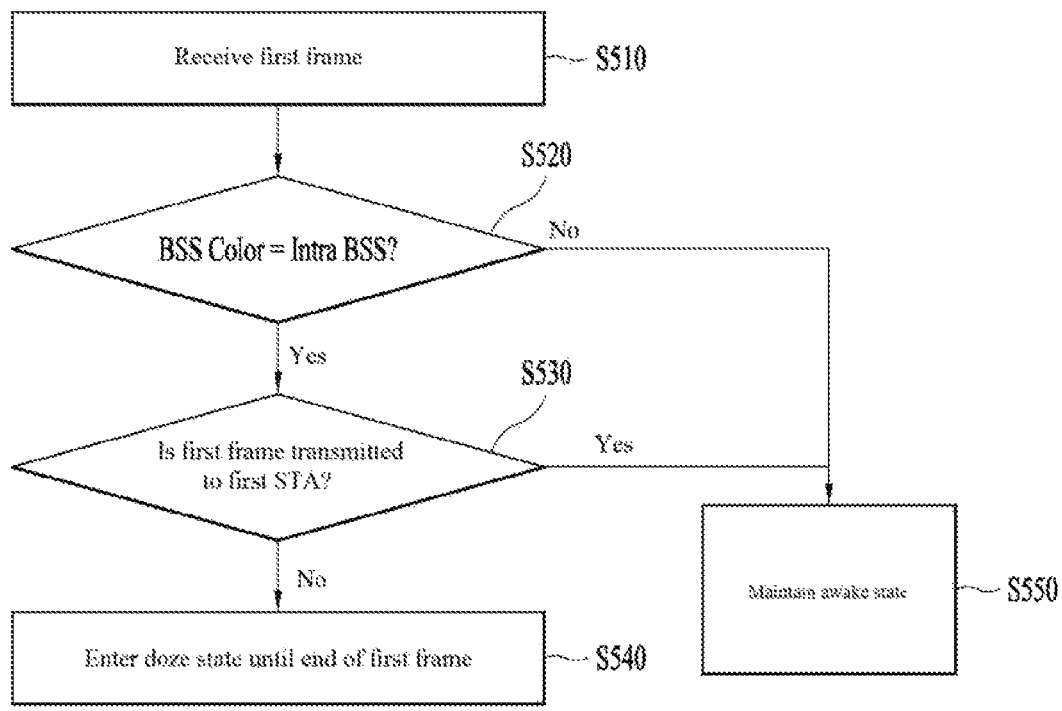
FIG. 5 is a diagram for explaining an intra-PPDU power saving scheme according to one embodiment of the present invention.

FIG. 5 is a flowchart for explaining an intra-PPDU power saving scheme according to one embodiment of the present invention.

As shown in FIG. 5, if an STA receives a specific frame (hereinafter, 'first frame') [S510], the STA can determine whether or not BSS color of the received first frame is matched with BSS color of a BSS associated with the STA [S520]. If the BSS color of the received first frame is not matched with the BSS color of the STA, the STA maintains an awake state [S550]. If the BSS color of the first frame is matched with the BSS color of the STA and the first frame is not a frame transmitted to the STA [S530], the STA can enter a doze state until the first frame ends [S540].

Specifically, (i) a case that an HE STA receives HE DL MU PPDU (IL FLAG=0) is explained. If BSS color information of a PPDU is matched with color information of a BSS associated with the HE STA and an identifier or a broadcast/multicast identifier of the STA is not included in HE-SIG B, the HE STA can enter a doze state until the HE DL MU PPDU ends. (ii) A case that the HE STA receives HE UL MU PPDU (UL FLAG=1) is explained. If BSS color information of a PPDU is matched with color information of a BSS associated with the HE STA, the HE STA can enter a doze state until the HE UL MU PPDU ends. (iii) A case that the HE STA receives HE SU PPDU is explained. If BSS color information of a PPDU is matched with color information of a BSS associated with the HE STA and a UL/DL indicator indicates UL, the HE STA can enter a doze state until the HE SU PPDU ends.

Collision Problem of BSS Color

As mentioned in the foregoing description, according to 11ax intra-PPDU power saving operation, if BSS color is matched with BSS color of an AP associated with HE STA based on BSS color included in HE-SIG A, the HE STA can reduce power consumption by entering a doze state until the remaining part of PPDU duration. However, if BSS color is used by a different BSS, the HE STA may enter the doze state after HE PPDU of OBSS is received. Hence, the HE STA may fail to receive PPDU of the HE STA.

According to the current discussion, the BSS color information included in the HE-SIG A has a size of 6 bits. Hence, confusion may occur with a surrounding BSS. In order to solve the confusion, it may consider a scheme of increasing the size of the BSS color. However, the scheme of increasing the size of the BSS color may cause an unnecessary signaling overhead problem.

And, as mentioned in the foregoing description, when a collision occurs between BSS colors, it may consider a scheme of indicating whether to perform power saving whenever PPDU is transmitted to prevent that an STA performs a wrong intra-PPDU power saving operation. However, the scheme may also cause unnecessary signaling overhead.

Therefore, as mentioned in the foregoing description, if an AP detects a collision of BSS color, a preferred embodiment of the present invention proposes a method that the AP informs an STA of information for disabling a BSS color-based operation.

Scheme of Indicating Disable of BSS Color-Based Operation

According to the present embodiment, an AP can activate or inactivate (disable) an intra-PPDU power saving operation operating based on BSS color of STAs. If a collision of BSS color is detected (i.e., if it is determined that a different BSS uses the same BSS color), the AP can disable BSS color-based intra-PPDU power saving of the STAs.

FIG. 6 is a diagram for explaining a format of a HE operation parameters field according to one embodiment of the present invention.

HE STAs belonging to a HE BSS can be controlled by HT operation element, VHT operation element, and HE operation element. Among the elements, the HE operation element related to a HE operation is shown in FIG. 6.

Referring to FIG. 6, a BSS color field may indicate BSS color corresponding to an AP, an IBSS STA, a mesh STA, or a TDLS STA, which has transmitted a corresponding element. In the present embodiment, assume that the BSS color maintains a size of 6 bits.

Meanwhile, as shown in FIG. 6, the HE operation element can additionally include a BSS color disabled subfield. In the present embodiment, if an AP recognizes overlap of BSS color with a neighboring BSS, the AP can disable a BSS color based operation by configuring the BSS color disabled subfield by 1. Besides, the BSS color disabled subfield can be set to 0.

Figure 7:
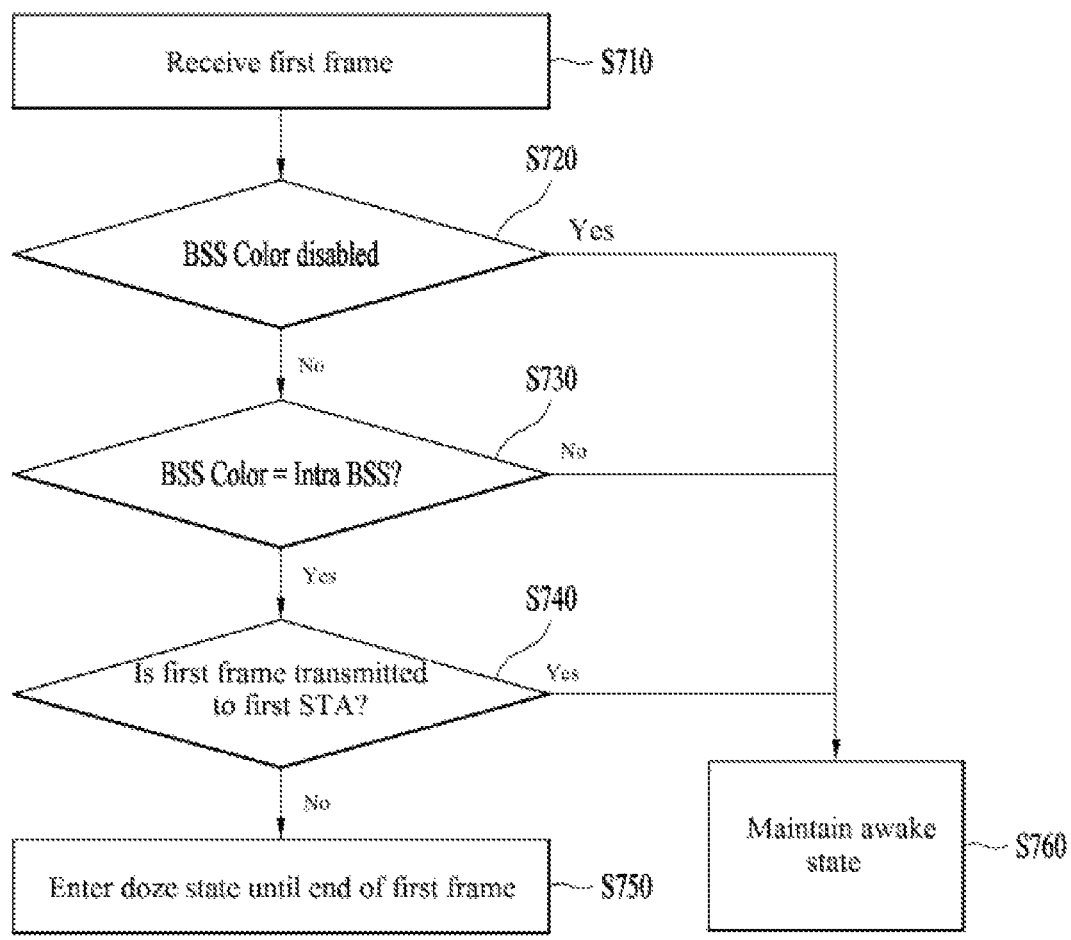
FIG. 7 is a flowchart for explaining an intra-BSS power saving scheme of an STA according to one embodiment of the present invention.

FIG. 7 is a flowchart for explaining an intra-BSS power saving scheme of an STA according to one embodiment of the present invention.

As shown in FIG. 7, if an STA receives a first frame [S710], the STA can determine whether a BSS color disabled field value of a most recently received HE operation element corresponds to 1 or 0 [S720]. The reception of the HE operation element is explained in detail in the following.

If the value of the BSS color disabled field is set to 1 to indicate the disable of the BSS color based operation, the STA can maintain an awake state without performing an intra-PPDU power saving operation [S760]. If the BSS color disabled field indicates 0, as mentioned earlier with reference to FIG. 5, the STA compares BSS color of the received first frame with BSS color of the STA [S730], determines whether or not the received first frame corresponds to a frame transmitted to the STA [S740], and may be then able to determine whether to enter a doze state according to intra-PPDU power saving [S750].

Specifically, (i) a case that an HE STA receives HE DL MU PPDU (IL FLAG=0) is explained. If BSS color information of a PPDU is matched with color information of a BSS associated with the HE STA, an identifier or a broadcast/multicast identifier of the STA is not included in HE-SIG B, and a value of a BSS color disabled field of a most recently received HE operation element corresponds to 0, the HE STA can enter a doze state until the HE DL MU PPDU ends. (ii) A case that the HE STA receives HE UL MU PPDU (UL FLAG=1) is explained. If BSS color information of a PPDU is matched with color information of a BSS associated with the HE STA and a value of a BSS color disabled field of a most recently received HE operation element corresponds to 0, the HE STA can enter a doze state until the HE UL MU PPDU ends. (iii) A case that the HE STA receives HE SU PPDU is explained. If BSS color information of a PPDU is matched with color information of a BSS associated with the HE STA, a UL/DL indicator indicates UL, and a value of a BSS color disabled field of a most recently received HE operation element corresponds to 0, the HE STA can enter a doze state until the HE SU PPDU ends.

Having entered the doze state, the STA manages a NAV timer of the STA while the STA is in the doze state and may be able to determine that a medium is busy.

Having entered the doze state, if the first frame ends, the STA switches to an awake state to attempt to access a medium.

In the following, a method of transmitting the abovementioned BSS color disabled is explained.

To this end, the first embodiment proposes that the BSS color disabled is transmitted to an STA using a broadcast scheme.

Figure 8:
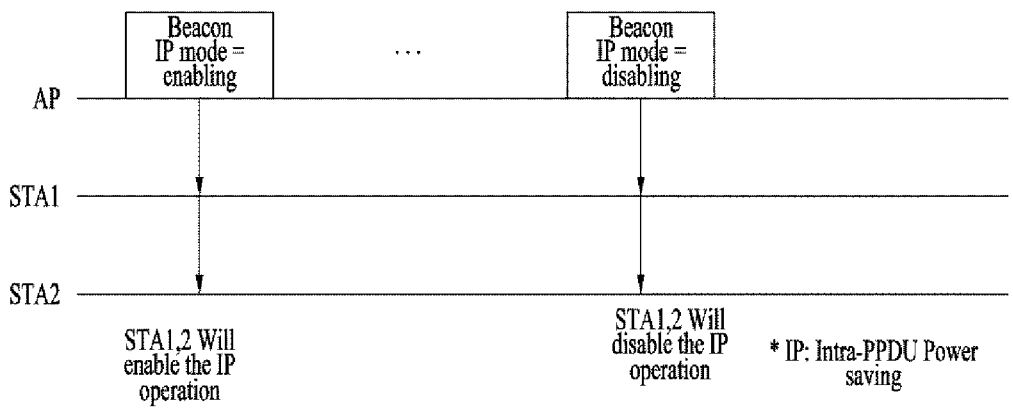
FIG. 8 is a diagram illustrating a scheme of informing an STA of BSS color disabled via a beacon according to one embodiment of the present invention.

FIG. 8 is a diagram illustrating a scheme of informing an STA of BSS color disabled via a beacon according to one embodiment of the present invention.

As shown in FIG. 8, an AP can inform an STA of whether intra-PPDU power saving is enabled or disabled via a beacon. It is able to inform STAs of whether BSS color based intra-PPDU power saving of the STAs is abled or disabled by adding a new element (e.g., the BSS color disabled) to a beacon frame or adding a new field to a legacy element. When the STAs associated with the AP receives the beacon frame, if the beacon frame indicates that the BSS color based intra-PPDU power saving is disabled, the STAs do not perform an intra-PPDU power saving operation until the BSS color based intra-PPDU power saving is activated.

A second embodiment proposes that the BSS color disabled is transmitted to an STA based on a request of the STA.

Figure 9:
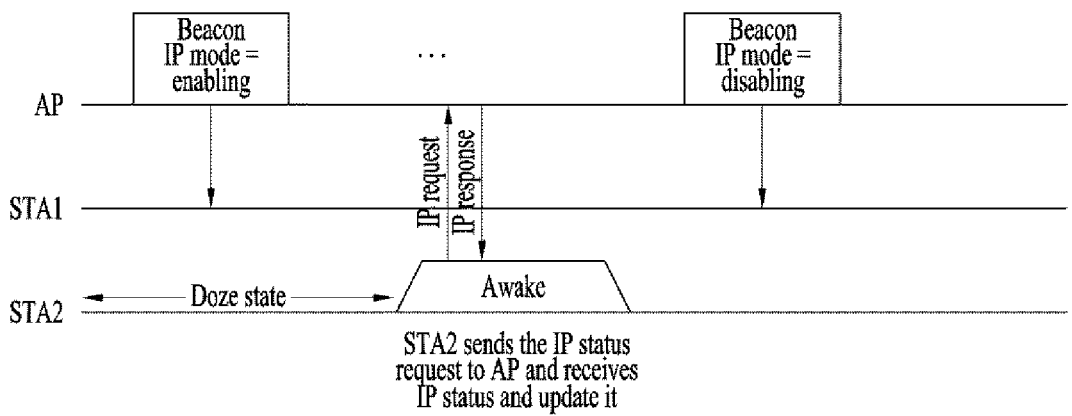
FIG. 9 is a diagram illustrating a scheme of informing an STA of BSS color disabled via a response message in response to a request of an STA according to one embodiment of the present invention.

FIG. 9 is a diagram illustrating a scheme of informing an STA of BSS color disabled via a response message in response to a request of an STA according to one embodiment of the present invention.

As shown in FIG. 9, when an AP informs an STA of an activated IP mode via a beacon and the STA performs an IP operation, the STA can make a request for a status (abled or disabled) of an intra-BSS PPDU power saving operation to the AP.

Having received a status request of the intra-BSS PPDU power saving operation from the STA, the AP can transmit a response frame to the STA in a manner of including status information of the intra-BSS PPDU power saving operation in the response frame. For example, if power saving STAs fails to obtain intra-PPDU status information via a broadcast method, the STAs can obtain the status information (information on whether intra-PPDU PS is abled or disabled) from the AP using the method proposed in the second embodiment.

The status request information can be forwarded to the AP in a manner of being piggyback to a different frame or can be delivered to the AP in a form of a request frame.

A third embodiment proposes that BSS color disabled is transmitted to an STA irrespective of a request of the STA.

Figures 10, 11:
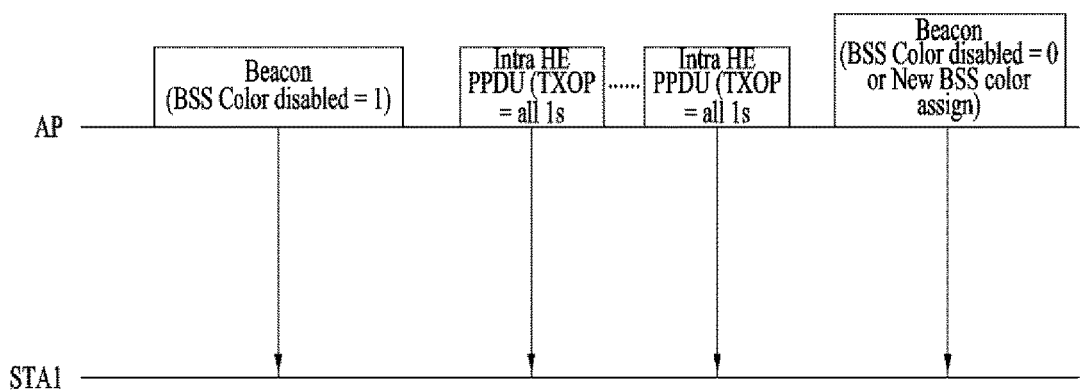
FIG. 10 is a diagram illustrating a scheme of informing an STA of BSS color disabled irrespective of a request of an STA according to one embodiment of the present invention.
FIG. 11 is a diagram for explaining a scheme of controlling a NAV setting according to one embodiment of the present invention.

FIG. 10 is a diagram illustrating a scheme of informing an STA of BSS color disabled irrespective of a request of an STA according to one embodiment of the present invention.

If a status of an intra-BSS PPDU power saving operation is changed (e.g., abled <-> disabled), an AP can transmit a frame to STAs by piggybacking status information of the intra-BSS PPDU power saving operation on the frame. For example, the AP may inform the STAs of the status information of the intra-BSS PPDU power saving operation by including the status information in a HE variant HT control field. In particular, the status information can be transmitted in a manner of being included in a ROMI (receiver operation mode indication) HT control field of the HE variant HT control field.

The abovementioned schemes can be used in a manner of being combined. For example, in the example shown in FIG. 7, the HE operation element shown in FIG. 6 can be received in a manner of being included in the first frame. Or, the HE operation element can be transmitted in a manner of being included in a beacon frame/response frame.

The activation/inactivation information transmitted by the AP can be transmitted in a form of a HE control field, an A-MPDU, or a single MPDU.

Setting of BSS Color Disabled and TXOP Duration Field

As mentioned in the foregoing description, if BSS color is collided with a neighbor BSS, since an STA is able to apply intra-PPDU PS to a PPDU transmitted by the neighbor BSS, the STA may lose a PPDU transmitted by an AP associated with the STA. One embodiment of the present invention proposes a method of solving the problem.

If a BSS color collision occurs, as mentioned in the foregoing description, the AP informs STAs of the collision (BSS collision indication) via a beacon frame. Having obtained information on the BSS color collision, the STAs may not perform an operation related to BSS color (e.g., intra-PPDU PS, NAV setting).

According to a different embodiment of the present invention, if a BSS color collision occurs, the AP may select a new BSS color and may be then able to inform STAs of the new BSS color via a beacon. In this case, in order to make all STAs accessing a BSS receive the new BSS color, the AP informs the STAs of information on the new BSS color and the BSS color collision for a sufficiently long time.

According to a preferred embodiment of the present invention, when HE STAs belonging to a corresponding BSS receive a beacon from an AP and transmit HE PPDU to the AP, a TXOP duration field of HE-SIG A is set to a specific value differentiated from a general duration value during a corresponding period, i.e., until a new BSS color is applied. For example, the TXOP duration field of the HE-SIG A can be set to all is (127). Of course, it is able to use a specific value corresponding to the aforementioned situation as well. In the following, an example of configuring the TXOP duration field of the HE-SIG A by all is (127) is explained. By doing so, it may be able to prevent an error of a different STA due to a wrong NAV (network allocation vector) setting.

NAV Update Operation of STA

In a WLAN system, medium access of an STA is performed based on physical sensing and logical sensing and the logical sensing is performed via NAV control of the STA.

For example, if an STA receives a valid frame not transmitted to the STA, the STA updates a NAV of the STA based on a duration field value of the frame and determines that a medium is busy while a corresponding NAV timer operates.

Specifically, if an STA receives one or more valid frames from a PSDU, the STA can update a NAV of the STA via a duration field of the PSDU. Yet, if an RA field of the PSDU is identical to a MAC address of the STA, the STA does not update the NAV of the STA.

However, as mentioned in the foregoing description, if an AP recognizes a BSS color collision and transmits a frame of which a duration value is set to all is to an STA, it is preferable that the STA does not update a NAV of the STA via the frame.

Meanwhile, flax system considers a method for an STA to separately manage a NAV for a BSS of the STA and a NAV for a different BSS. In the following, the method is explained.

A HE STA can manage heterogeneous NAVs including an intra-BSS NAV corresponding to a NAV for the internal of a BSS and an inter-BSS NAV corresponding to a NAV for the external of a BSS. Among the intra-BSS NAV and the inter-BSS NAV, the inter-BSS NAV can be referred to as a regular NAV. Of course, such a term as the regular NAV can be changed.

When an STA manages the two NAVs, if the STA receives a PSDU of an intra-BSS frame, the STA can update the intra-BSS NAV according to duration field information of the received PSDU. If the STA receives a PSDU of an inter-BSS frame, the STA can update the regular NAV according to duration field information of the received PSDU.

In the foregoing description, an example of updating a NAV based on a duration field of a received PSDU has been explained. In this case, it is able to identically update the intra-BSS NAV or the regular NAV using a TXOP duration of HE SIG-A of a received HE PPDU as well.

If an RA field of a received frame indicates an STA itself, the STA does not update a corresponding NAV. If the RA field of the received frame does not indicate the STA itself, it may be able to update a corresponding NAV based on a duration field of a PSDU or TXOP duration field information of HE SIG-A according to whether the received frame corresponds to an inter-BSS frame or an intra-BSS frame.

In particular, if a specific STA supports two NAVs, one or more NAVs are considered among the two NAVs, and one or more NAV counters are not 0, a virtual CS may determine that a medium is busy.

When the two NAVs are managed, if such a frame as a CTS frame and an ACK frame incapable of being identified as an inter-BSS frame or an intra-BSS frame is received, it is regulated as an STA updates an inter-BSS NAV (regular NAV). In particular, as mentioned in the foregoing description, if BSS color is disabled, similar to a case incapable of distinguishing an inter-BSS frame from an intra-BSS frame, the present invention proposes that an STA updates the inter-BSS NAV (regular NAV).

Yet, as mentioned in the foregoing description, if an AP configures duration value by a specific value (e.g., all 1s) differentiated from a normal duration value, it may be preferable not to update the inter-BSS NAV as well.

FIG. 11 is a diagram for explaining a scheme of controlling a NAV setting according to one embodiment of the present invention.

As shown in FIG. 11, if an AP detects a collision of BSS color, the AP can transmit a beacon of which a BSS color disabled field is set to 1 to an STA. subsequently, in order to prevent wrong NAV update of the STA, the AP sets a value of a TXOP duration field of a PPDU to all 1s.

Having received a frame to which the TXOP duration field is set, the STA does not update a NAV of the STA.

Subsequently, if BSS color change is completed, the AP sets a BSS color disabled field to 0 and can transmit the BSS color disabled field to the STA.

In particular, when a TXOP duration field of HE-SIG A is set to all is (i.e., 127), although BSS color corresponds to intra-BSS color, a HE STA performs payload decoding (PSDU) to obtain MAC duration without performing intra-PPDU PS. In particular, if the TXOP duration field is set to all is (127), the HE STA does not enter a doze state and does not update a NAV.

Meanwhile, when BSS color is disabled, a case that a HE STA receives an intra-PPDU of which TXOP duration is set to a normal value (i.e., a value rather than all 1s) is explained.

Figure 12:
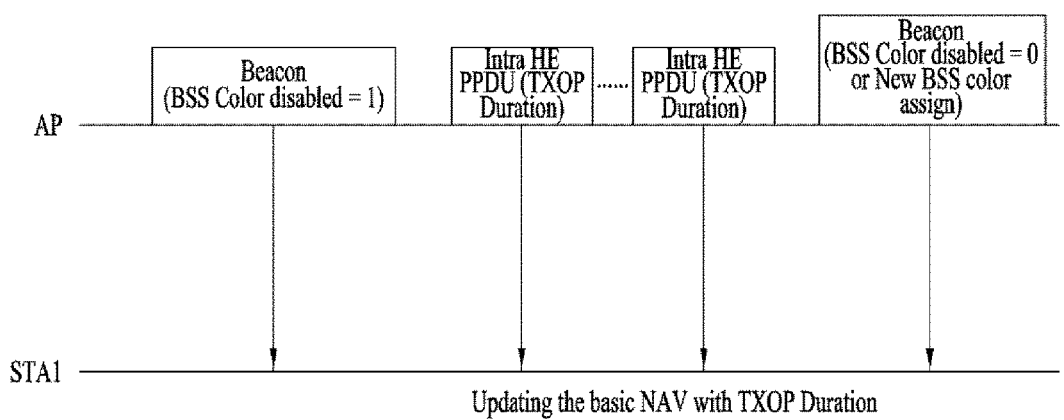
FIG. 12 is a diagram for explaining a scheme of updating a NAV when TXOP duration has a normal value according to one embodiment of the present invention.

FIG. 12 is a diagram for explaining a scheme of updating a NAV when TXOP duration has a normal value according to one embodiment of the present invention.

As shown in FIG. 12, assume a case that an AP configures BSS color disabled by 1 in the present embodiment. Since the BSS color is disabled, it is unable to determine whether a PPDU corresponds to an intra-PPDU or an inter-PPDU. Hence, it is preferable to update a basic NAV instead of an intra-BSS NAV using a value set to a TXOP duration field considering the PPDU as an unidentified PPDU.

In summary, a condition for determining a received frame as an intra-BSS frame is shown in the following.

TABLE 3

A frame received by the STA is an intra-BSS frame if one of the following conditions is true:
The RXVECTOR parameter BSS_COLOR in the received PPDU carrying the frame is the same as the BSS color announced by the AP to which the STA is associated and the most recently received HE Operation element from the AP to which it is associated contained a value of 0 in the BSS Color Disabled subfield And, a condition for updating an intra-BSS NAV of an STA to which the abovementioned content is reflected can be summarized as follows.

TABLE 4

A STA shall update the intra-BSS NAV with the duration information indicated by the RXVECTOR parameter TXOP_DURATION if and only if all the following conditions are met:

TABLE 4-continued

Figure 13:
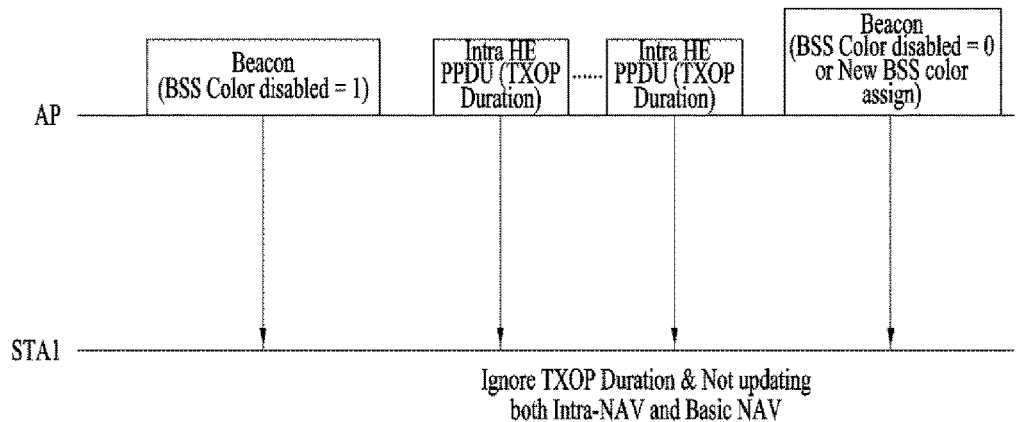
FIG. 13 is a diagram for explaining a scheme of updating a NAV when TXOP duration is set to all is according to one embodiment of the present invention.

The RXVECTOR parameter TXOP_DURATION is not set to all is
The PPDU that carried information of the RXVECTOR parameter is identified as intra-BSS according to the rule described in 27.2.1 (Intra-BSS and inter-BSS frame detection) and the most recently received HE Operation element from the AP to which it is associated contained a value of 0 in the BSS Color Disabled subfield
The STA does not receive a frame with the duration information indicated by a Duration field in the PSDU of the PPDU carrying the RXVECTOR parameter TXOP_DURATION
The duration information indicated by the RXVECTOR parameter TXOP_DURATION is greater than the STA's current intra-BSS NAV
The PPDU that carried information of the RXVECTOR parameter is not an HE trigger-based PPDU triggered by the STA FIG. 13 is a diagram for explaining a scheme of updating a NAV when TXOP duration is set to all is according to one embodiment of the present invention.

In particular, when a BSS color disabled subfield, which is included in a HE operation element most recently received from an AP associated with an STA, is set to 1, although RXVECTOR parameter BSS_COLOR is identical to BSS_COLOR of the AP associated with the STA, the STA does not consider it as an intra-BSS frame. Hence, the STA does not update an intra-BSS NAV. A corresponding frame is considered as an unidentified frame and an RXVECTOR TXOP_DURATION field of a received PPDU is updated to a basic NAV. Of course, if a TXOP_duration field of a received frame is set to all 1s, it is preferable for the STA not to update the basic NAV as well.

Duration Set to All 1s and EIFS Operation

According to the abovementioned method, when OBSS STAs receive a corresponding PPDU, since a TXOP field is set to all 1s, the STAs do not update a NAV using the TXOP duration field for the PPDU. Hence, there is a problem that the PPDU is not protected.

In order to solve the problem, if it fails to decode MAC data payload for a received PPDU, one embodiment of the present invention proposes to invoke an EIFS operation.

Specifically, if an intra-PPDU (if BSS color of a received PPDU is identical to BSS color of an AP associated with a HE STA, the received PPDU is regarded as a BSS color based intra-PPDU) is received, the HE STA of which BSS color is disabled does not update both an intra-BSS NAV and a basic (regular) NAV using a TXOP duration field. In particular, the HE STA ignores a value of the TXOP duration field. If the HE STA fails to decode MAC data payload for the received PPDU, the HE STA invokes an EIFS operation. In particular, although a valid TXOP_duration parameter is included in RXVECTOR of the received PPDU (i.e., if TXOP duration field value is not set to all 1s, it is regarded as valid), if BSS color is disabled (BSS color disabled subfield is set to 1), EIFS can be invoked.

If a valid TXOP_duration parameter is included in RXVECTOR of a received PPDU and a BSS color disabled subfield, which is included in a HE operation element most recently received from an associated AP, is set to 0, EIFS is not invoked.

It may be able to summarize as Table 5 in the following.

TABLE 5

A DCF of HE STAs shall use EIFS before transmission, when it determines that the medium is idle following reception of a frame for which the PHY-RXEND.indication primitive contained an error or a frame for which the FCS value was not correct and the most recently received HE Operation element from the AP to which it is associated contained a value of 0 in the BSS Color Disabled subfield.

TABLE 5-continued

Figure 14:
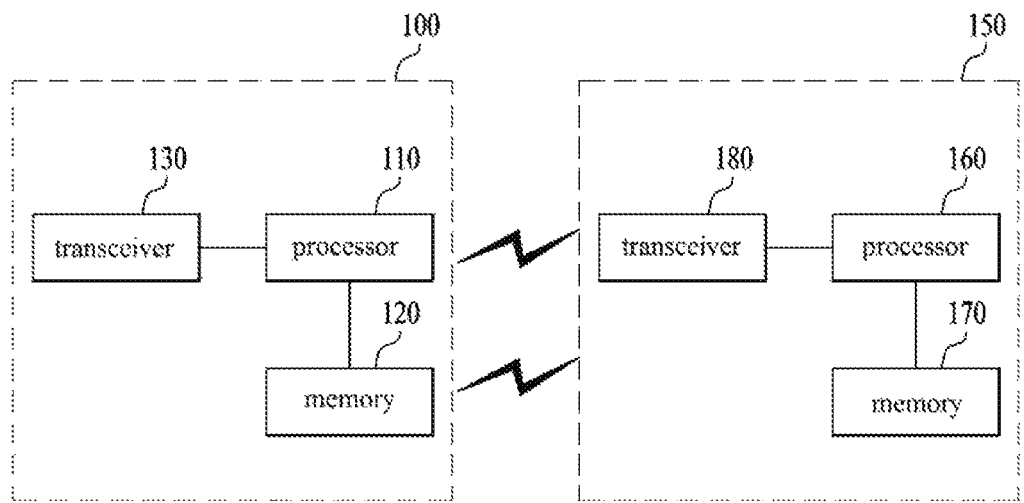
FIG. 14 is a block diagram illustrating an exemplary configuration of an AP (or, a base station) and a station (or, a user equipment) according to one embodiment of the present invention.

EIFS shall not be invoked if a valid TXOP_DURATION parameter is present in the RXVECTOR of a received HE PPDU and the most recently received HE Operation element from the AP to which it is associated contained a value of 0 in the BSS Color Disabled subfield Apparatus Configuration FIG. 14 is a block diagram for an exemplary configuration of an AP (or a base station) and an STA (or a UE) according to one embodiment of the present invention.

An AP 100 can include a processor 110, a memory 120, and a transceiver 130. An STA 150 can include a processor 160, a memory 170, and a transceiver 180.

The transceiver 130/180 can transmit/receive a radio signal and implement a physical layer according to IEEE 802 system. The processor 110/160 is connected with the transceiver 130/180 and can implement a physical layer and/or a MAC layer according to IEEE 802 system. The processor 110/160 is configured to perform an operation according to one or a combination of two or more embodiments of the present invention. A module for implementing operations of the AP and the STA according to the various embodiments of the present invention is stored in the memory 120/170 and the module can be executed by the processor 110/160. The memory 120/170 can be connected with the processor 110/160 via a well-known media in a manner of being included in the processor 110/160 or being installed in the outside of the processor 110/160.

Explanation on the AP 100 and explanation on the STA 150 can be respectively applied to a base station and a user equipment in a different wireless communication system (e.g., LTE/LTE-A system).

The configurations of the AP and the STA as described above may be implemented such that the above-described embodiments can be independently applied or two or more thereof can be simultaneously applied, and description of redundant parts is omitted for clarity.

Figure 15:
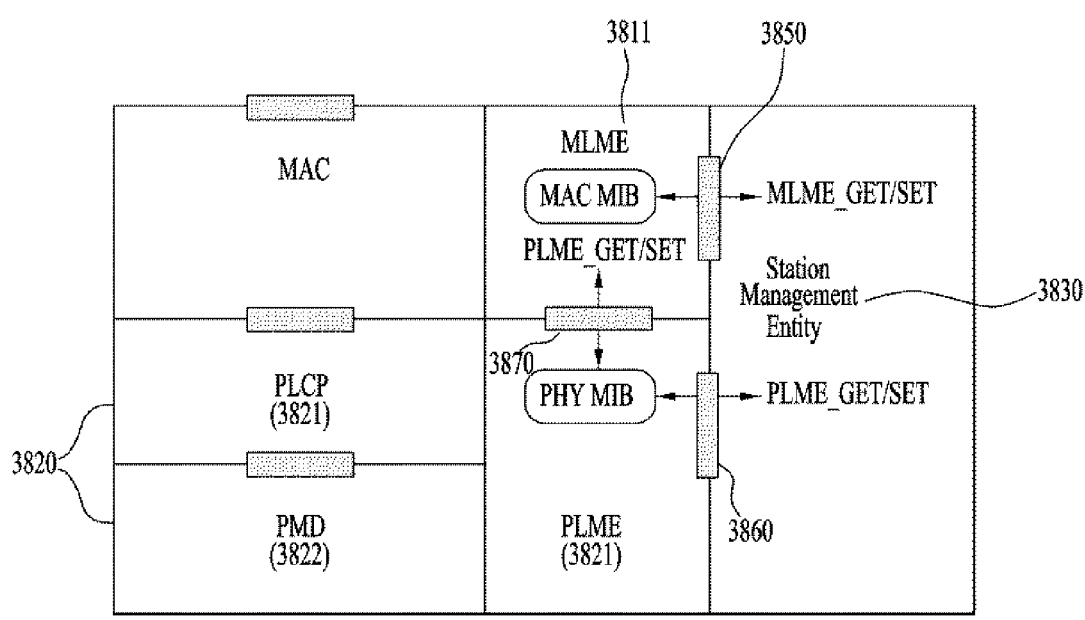
FIG. 15 illustrates an exemplary configuration of a processor of an AP or a station according to one embodiment of the present invention.

FIG. 15 is a diagram for an exemplary configuration of a processor of an AP or an STA according to one embodiment of the present invention.

A processor of an AP or an STA may have a structure of a plurality of layers. FIG. 15 mainly shows a MAC sublayer 3810 and a physical layer 3820 on a DLL (data link layer) among a plurality of the layers. As shown in FIG. 15, the PHY 3820 can include a PLCP (physical layer convergence procedure) entity 3821 and a PMD (physical medium dependent) entity 3822. Both the MAC sublayer 3810 and the PHY 3820 include management entities conceptually referred to as an MLME (MAC sublayer management entity) 3811. The entities 3811/3821 provide a layer management service interface in which a layer management function is operating.

In order to provide a precise MAC operation, an SME (station management entity) 3830 exists in each STA. The SME 3830 corresponds to a layer-independent entity capable of exiting in a separate management plane or capable of being seen as a separate entity (off to the side). Although precise functions of the SME 3830 are not explained in detail in the present specification, the entity 3830 is in charge of collecting lay-dependent status from various layer management entities and similarly configuring values of layer-specific parameters. In general, the SME 3830 performs the aforementioned functions on behalf of a general system management entity and may be able to implement a standard management protocol.

The entities shown in FIG. 15 interact with each other using various schemes. FIG. 15 shows several examples of exchanging GET/SET primitives. XX-GET.request is used to request a value of a given MIB attribute (management information-based attribute information). If status corresponds to "success", XX-GET.confirm primitive returns an appropriate MIB attribute information value. Otherwise, the XX-GET.confirm primitive is used to return an error indication to a status field. XX-SET.request primitive is used to request that an indicated MIB attribute is configured by a given value. If the MIB attribute corresponds to a specific operation, it indicates that the MIB attribute requests to perform the specific operation. If status corresponds to "success", XX-SET.confirm primitive confirms that an MIB attribute is configured by a requested value. Otherwise, the XX-SET.confirm primitive is used to return an error condition to a status field. If the MIB attribute corresponds to a specific operation, it confirms that the specific operation has been performed.

As shown in FIG. 15, the MLME 3811 and the SME 3830 can exchange various MLME_GET/SET primitives with each other via an MLME_SAP 3850. And, various PLCM_GET/SET primitives can be exchanged between the PLME 3821 and the SME 3830 via a PLME_SAP 3860 and can be exchanged between the MLME 3811 and the PLME 3821 via a MLME-PLME_SAP 3870.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein. The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

And, both an apparatus invention and a method invention are explained in the present specification and the explanation on the both of the inventions can be complementally applied, if necessary.

INDUSTRIAL APPLICABILITY

The present invention can be applied to various wireless systems including IEEE 802.11 system.

What is claimed is:

1. A method for an AP (access point) controlling a NAV (network allocation vector) setting of an STA (station) in a WLAN (wireless local area network) system, the method comprising:
    detecting a BSS (basic service set) color overlap with an OBSS (overlapping basic service set);
    transmitting, to the STA, a first frame containing BSS color disabled information set to a first value indicating disablement of a use of the BSS color; and
    transmitting, to the STA, a second frame containing a TXOP_DURATION field set to a specific value other than normal duration values in response to the AP setting the BSS color disabled information to the first value.

2. The method of claim 1, wherein, if the TXOP_DURATION field is set to the specific value, the STA does not update a NAV based on a value of the TXOP_DURATION field.

3. The method of claim 1, wherein, although BSS color of the second frame is identical to BSS color of a BSS to which the STA belongs, the BSS color disabled information set to the first value makes the STA update an inter-BSS NAV.

4. The method of claim 3, wherein, if a value of the TXOP_DURATION field is set to the specific value, the STA does not update the inter-BSS NAV.

5. The method of claim 1, wherein, if a value of the TXOP_DURATION field is configured by the specific value, the STA operates based on an EIFS (extended interframe space).

6. The method of claim 1, wherein the specific value of the TXOP_DURATION field corresponds to a value that all bits are set to 1.

7. A method of configuring a NAV (network allocation vector) of an STA (station) in a WLAN (wireless local area network) system, the method comprising:
    receiving a first frame containing BSS (basic service set) color disabled information set to a first value indicating disablement of BSS color information, from an AP (access point); and
    receiving, from the AP, a second frame containing a TXOP_DURATION field set to a specific value other than normal duration values in response to the AP setting the BSS color disabled information to the first value,
    wherein, if a value of the TXOP_DURATION field is set to the specific value, the STA does not update a NAV based on the value of the TXOP_DURATION field.

8. The method of claim 7, wherein the first frame containing the BSS color disabled information set to the first value is received when the AP detects a BSS (basic service set) color overlap with an OBSS (overlapping basic service set).

9. The method of claim 7, wherein, if the BSS color disabled information set to the first value is received, the STA updates an inter-BSS NAV, although BSS color of the second frame is identical to BSS color of a BSS to which the STA belongs.

10. The method of claim 9, wherein, if a value of the TXOP_DURATION field is configured by the specific value, the STA does not update the inter-BSS NAV.

11. The method of claim 7, wherein, if a value of the TXOP_DURATION field is configured by the specific value, the STA operates based on an EIFS, extended interframe space.

12. The method of claim 7, wherein the specific value of the TXOP_DURATION field corresponds to a value that all bits are set to 1.

13. An AP (access point) controlling a NAV (network allocation vector) setting of an STA (station) in a WLAN (wireless local area network) system, the AP comprising:
    a processor configured to detect a BSS (basic service set) color overlap with an OBSS (overlapping basic service set); and
    a transceiver configured to transmit to the STA under control of the processor,
    a first frame containing BSS color disabled information set to a first value indicating disablement of BSS color information, in response to the processor detecting a BSS color overlap, and
    a second frame containing a TXOP_DURATION field set to a specific value other than normal duration values in response to the processor setting the BSS color disabled information to the first value.

14. An STA (station) performing a NAV (network allocation vector) setting in a WLAN (wireless local area network) system, the STA comprising:
    a transceiver configured to receive, from an AP (access point), a first frame containing BSS color disabled information set to a first value indicating disablement of BSS (basic service set) color information, and a second frame containing a TXOP_DURATION field set to a specific value other than normal duration values in response to the AP setting the BSS color disabled information to the first value; and
    a processor configured not to update a NAV based on a value of the TXOP_DURATION field if the value of the TXOP_DURATION field is set to the specific value.

* * * * *